Oct. 30, 1951

J. M. L. JANSSEN 2,573,447

CIRCUIT ARRANGEMENT FOR GENERATING PHASE MODULATED OSCILLATIONS

Filed Jan. 11, 1947

JOHANNES MARINUS LODEVICUS JANSSEN
INVENTOR

BY Fred M Vogel

AGENT

Patented Oct. 30, 1951

2,573,447

UNITED STATES PATENT OFFICE 2,573,447

CIRCUIT ARRANGEMENT FOR GENERATING PHASE MODULATED OSCILLATIONS

Johannes Marinus Lodevicus Janssen, Eindhoven, Netherlands, assignor to Hartford National Bank and Trust Company, Hartford, Conn., as trustee Application January 11, 1947, Serial No. 721,652
In the Netherlands November 9, 1945

Section 1, Public Law 690, August 8, 1946
Patent expires November 9, 1965

6 Claims. (Cl. 332—24)

Figure 1:
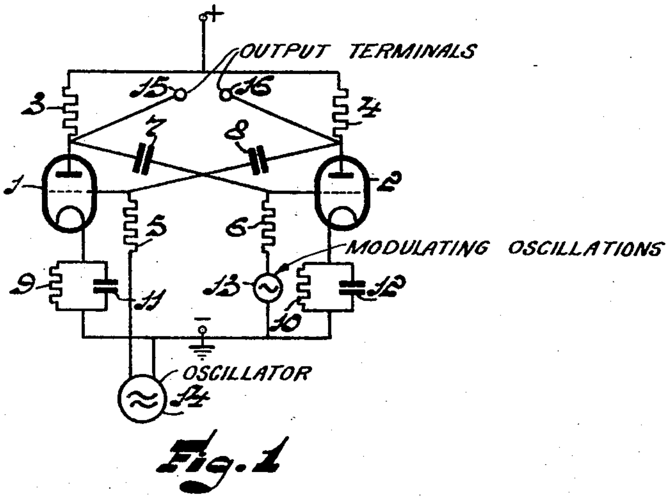

For generating phase-modulated oscillations use is made, as a rule, of a resonant circuit to which a voltage of constant frequency is supplied by an oscillator and which is detuned in the rhythm of the modulating oscillations with respect to the frequency of the oscillator. This detuning may be effected, for example, by connecting in parallel to the oscillatory circuit a so-called reactance tube, the mutual conductance of which is controlled by the modulating oscillations.

An arrangement of this kind only permits obtaining sinusoidal phase-modulated oscillations whilst moreover the phase sweep shows a linear variation with the modulating voltage only within a comparatively small region.

The present invention relates to an arrangement which generates phase-modulated oscillations of any arbitrary wave shape, such as sawtooth or rectangular shape in addition to waves of sinusoidal shape, and in which the phase sweep is linearly dependant on the modulating voltage over wide limits.

The circuit arrangement according to the invention comprises an oscillator which is modulated in frequency by the modulating oscillations and which is, in addition, synchronised by a source of oscillations so that the modulation only brings about phase variations and no frequency variations of the oscillator, the phase-modulated oscillations being derived from the synchronised and modulated oscillator.

The present invention utilises the phenomenon known per se that in a synchronised oscillator which for some reason or other would vary its frequency but is hindered in this effort by the synchronisation, the phase angle of the generated oscillations varies.

This phase angle, in general, is proportional to the difference between the frequencies of the two oscillators which would occur if one oscillator were synchronised by the other. Consequently, by modulating one oscillator in such a manner that, in the absence of the synchronisation, frequency modulation would occur and by synchronising this oscillator with another oscillator of constant frequency it is ensured that the phase angle of the generated oscillations varies with the modulation, in other words phase modulation is produced.

For generating phase-modulated rectangular oscillations a multivibrator in which the modulated oscillations control the grid voltage of one of the tubes may be used. As is well-known, without synchronisation the frequency of the generated rectangular oscillations would show a linear vibration with the modulating voltage through a fairly large region. If, now, the multivibrator is synchronised with an oscillator of constant frequency, for example a crystal oscillator, the frequency of the oscillation of the multivibrator remains constant and its phase varies in accordance with modulation.

A similar result is obtained with oscillators which generate different oscillation curves, for example of sawtooth shape, when modulated in frequency and synchronised with another oscillator.

Figure 2:
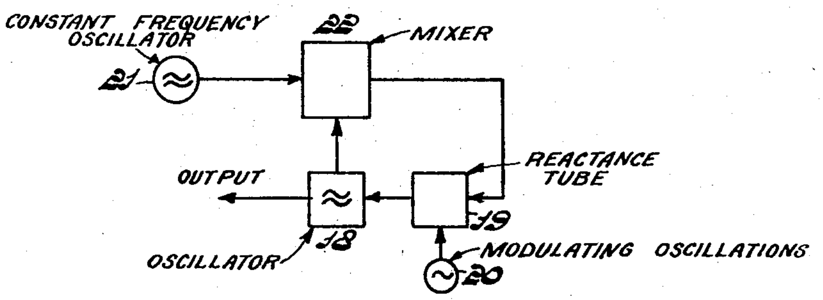

The invention will be explained more fully by reference to the accompanying drawing forming a part of the specification and in which:

Fig. 1 is a schematic diagram of a phase-modulation generator according to the invention, and Fig. 2 is a block diagram of an alternate form of a phase-modulation generator according to the invention.

The circuit arrangement shown in Figure 1 comprises a multivibrator having tubes 1 and 2, anode resistances 3 and 4, grid leak resistances 5 and 6, and coupling condensers 7 and 8. For generating negative grid biases the cathode leads include resistances 9, 10 which are shunted by condensers 11 and 12.

In series with the grid lead resistance 6 there is shown a source of supply 13 which supplies the modulating oscillations to the grid of tube 2. Without any further expedients the multivibrator would generate rectangular oscillations of constant amplitude and variable frequency, in which event the instantaneous value of the frequency would be a function of the instantaneous amplitude of the modulating oscillations supplied by the source of supply 13. However, the multivibrator is synchronised by a voltage originating from an oscillator 14 and applied, through the leakage resistance 5, to the grid of tube 1 with the result that the frequency of the multivibrator is retained and the modulating voltage only brings about phase variations in the oscillation of the multivibrator. The phase-modulated oscillations may be derived, for example, from terminals 15, 16.

The arrangement shown may be used for generating phase-modulated sinusoidal oscillations by filtering out the fundamental frequency of a harmonic with the aid of a filter, for example a resonant circuit. If the maximum phase sweep of the fundamental frequency is $\varphi$, the maximum phase sweep of the $n$th harmonic is $n\varphi$ so that filtering out a higher harmonic has the effect of producing in a simple manner a very large phase sweep which with the known arrangements is only obtainable in a manner which is much more complicated, viz. by means of frequency multiplication.

The multivibrator need not be synchronised at the same frequency as the oscillator 14; it is alternatively possible that the fundamental frequency of the oscillation of the multivibrator is a higher harmonic or a subharmonic of the frequency of the oscillator 14.

Figure 2 shows diagrammatically an arrangement for generating sinusoidal phase-modulated oscillations.

Referring to Fig. 2 there is shown an oscillator 18 which is modulated in frequency by a reactance tube 19, the modulating oscillations originating from a source 20 being supplied to the reactance tube 19. The oscillations generated by the oscillator 18 are mixed with the oscillations of a further oscillator 21 of constant frequency in a mixing circuit 22. The output voltage of this mixing circuit is applied to the reactance tube. In this arrangement the oscillator 18 is synchronised by the oscillator 21 through the intermediary of the mixing circuit 22 and the reactance tube 19. If, starting from the condition in which the two oscillators have the same frequency, the oscillator 18, for example, tends to increase its frequency, a direct voltage occurs in the output circuit of the mixing circuit 22. This direct voltage controls the reactance tube 19 with the result that its reactance increases and the increase in frequency of the oscillator 18 is neutralised. The phase of the oscillator 18 has, however, changed in such manner that the direct voltage in the output circuit of the mixing arrangement is maintained. Consequently, frequency modulation of the oscillator 18 has the effect of varying the phase of the oscillations generated by it, so that phase modulation is produced.

What I claim is:

1. A circuit arrangement for generating phase modulated oscillations, comprising an oscillator source of an oscillation, said oscillator source being normally characterized by frequency variations about a given value proportional to variations of an operating condition thereof about a given value, a source of a wave of constant frequency and given phase value, said wave source being independent of said oscillator source, means to apply said wave to said oscillator to synchronize said oscillator with said wave source at a frequency bearing a multiple relationship to the frequency of said wave, and means to cyclically vary the said operating condition of said oscillator to cyclically vary the phase of said oscillation relative to said wave to thereby produce phase modulated oscillations having substantially zero frequency variations.

2. A circuit arrangement for generating phase modulated oscillations, comprising an oscillator source of an oscillation, said oscillator source being normally characterized by frequency variations about a given value proportional to variations about a given value of an operating potential applied thereto, a source of a wave of constant frequency and given phase value, said wave source being independent of said oscillator source, means to apply said wave to said oscillator to synchronize said oscillator with said wave source at a frequency bearing a multiple relationship to the frequency of said wave, and means to apply the said operating potential to said oscillator to thereby vary the phase of said oscillation relative to said wave to thereby produce phase modulated oscillations having substantially zero frequency variations.

3. A circuit arrangement for generating phase modulated oscillations, comprising an oscillator source of an oscillation, said oscillator source being normally characterized by frequency variations about a given value proportional to variations of an operating condition thereof about a given value, a source of a wave of constant frequency and given phase value, means to apply said wave to said oscillator to synchronize said oscillator with said wave source at a frequency bearing a harmonic relationship to the frequency of said wave, and means to cyclically vary the said operating condition of said oscillator to cyclically vary the phase of said oscillation relative to said wave to thereby produce phase modulated oscillations having substantially zero frequency variations.

4. A circuit arrangement for generating phase modulated oscillations, comprising an oscillator source of an oscillation, said oscillator source being normally characterized by frequency variations about a given value proportional to variations of an operating condition thereof about a given value, a source of a wave of constant frequency and given phase value, means to apply said wave to said oscillator to synchronize said oscillator with said wave source at a frequency bearing a sub-harmonic relationship to the frequency of said wave, and means to cyclically vary the said operating condition of said oscillator to cyclically vary the phase of said oscillation relative to said wave to thereby produce phase modulated oscillations having substantially zero frequency variations.

5. A circuit arrangement for generating phase modulated oscillations, comprising a multi-vibrator source of an oscillation, said source being normally characterized by frequency variations about a given value proportional to amplitude variations of a modulating potential applied thereto, a source of a wave of constant frequency and given phase value, said wave source being independent of said oscillator source, means to apply said wave to said multi-vibrator source to synchronize said multi-vibrator with said wave source at a frequency bearing a multiple relationship to the frequency of said wave, and means to apply a modulating potential to the multi-vibrator source to thereby vary the phase of said oscillation relative to said wave to thereby produce phase modulated oscillations having substantially zero frequency variations.

6. A circuit arrangement for generating phase modulated oscillations, comprising an oscillator source of an oscillation, said oscillator being normally characterized by frequency variations about a given value proportional to variations of an operating condition thereof about a given value, a source of a wave of constant frequency and given phase value, said wave source being independent of said oscillator source, means to mix said oscillation and wave to produce a control potential, a reactance tube circuit coupled to said oscillator source for varying said operating condition, means to apply said control potential to said reactance tube to synchronize said oscillator with said wave source at a frequency bearing a multiple relationship to the frequency of said wave, and means to apply a modulating potential to said reactance tube to vary the said operating condition of said oscillator to thereby cyclically vary the phase of said oscillation relative to said wave to thereby produce phase modulated oscillations having substantially zero frequency variations.

JOHANNES MARINUS
LODEVICUS JANSSEN.

REFERENCES CITED

The following references are of record in the file of this patent:

UNITED STATES PATENTS

| Number | Name | Date |
|---|---|---|
| 2,279,659 | Crosby | Apr. 14, 1942 |
| 2,306,052 | Goldstine | Dec. 22, 1942 |
| 2,392,114 | Bartelink | Jan. 1, 1946 |
| 2,426,996 | Goodall | Sept. 9, 1947 |
| 2,437,872 | Bailey | Mar. 16, 1948 |